(No Model.)
N. MERRILL.
VELOCIPEDE.
No. 249,853. Patented Nov. 22, 1881.
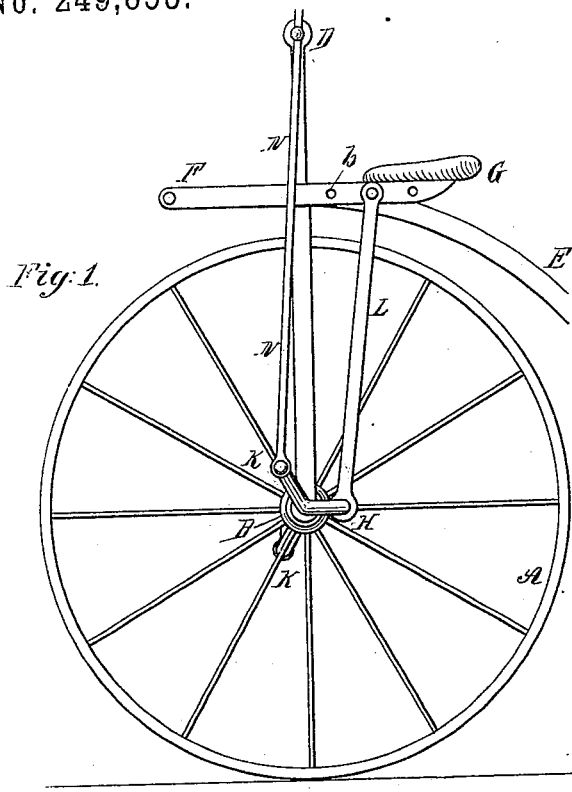
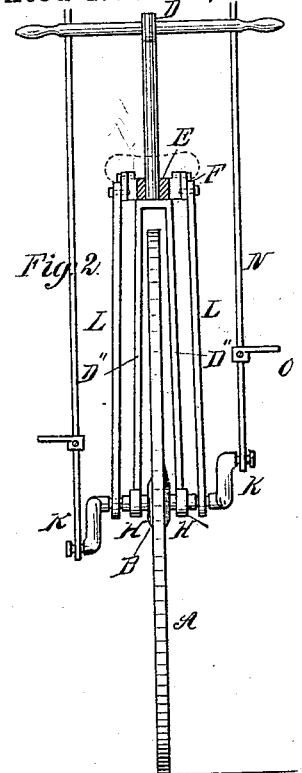
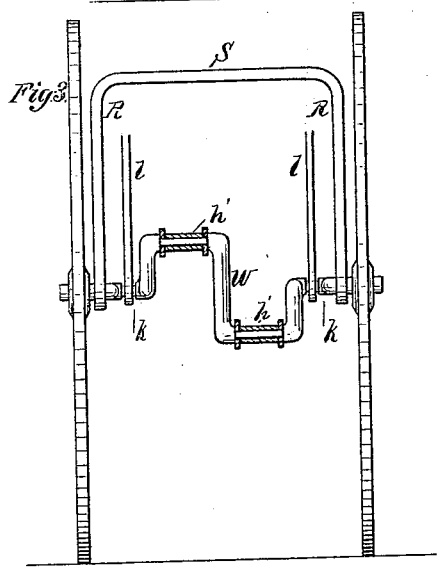
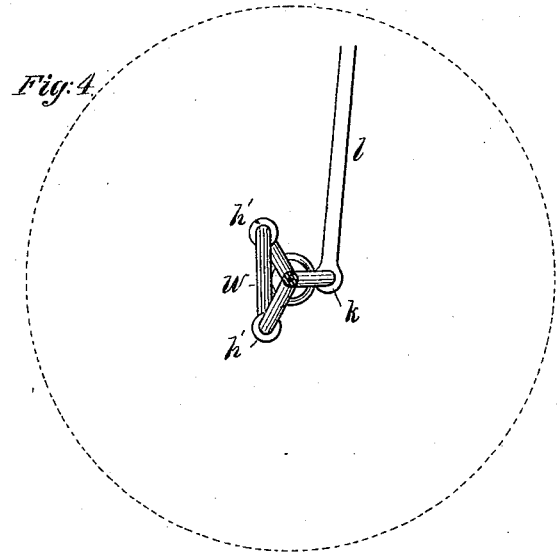
Witnesses;
Geo. H. Brandon
J. P. Acker
Inventor;
Nelson Merrill
By David A. Burr
Atty

UNITED STATES PATENT OFFICE.

NELSON MERRILL, OF NEW YORK, N. Y.

VELOCIPEDE.

SPECIFICATION forming part of Letters Patent No. 249,853, dated November 22, 1881.

Application filed July 7, 1880. (No model.)

*To all whom it may concern:*

Be it known that I, NELSON MERRILL, a citizen of the United States, residing at the city, county, and State of New York, have invented certain new and useful Improvements in Velocipedes; and I do hereby declare that the following is a full, clear, and exact description thereof, reference being had to the accompanying drawings, and to the letters of reference marked thereon, making a part of this specification.

This invention relates to an improvement in the application of mechanical power derived from the weight and muscular effort of the operator to produce the revolution of a shaft or of an axle, either for use as a motor in general or specially for the propulsion of a velocipede or other form of wheeled vehicle.

It consists in combining with the axle of a bicyle or tricycle or the shaft of a motor two pedal-cranks projecting therefrom at an angle with each other of about one hundred and twenty degrees, and in interposing a shorter double crank or pair of cranks to project from the axle or shaft at an angle with the pedal-cranks of about one hundred and twenty degrees, and to be coupled by connecting rods with the free ends of horizontal levers, pivoted to vibrate vertically and carry a seat or support for the person operating the machine.

The object of my invention is to avoid a dead-center and to utilize the weight of the rider when seated in driving the machine.

In the accompanying drawings, Figure 1 is a side elevation, and Fig. 2 a front view, of a tricycle embodying my invention and constructed with a single large driving-wheel; Fig. 3, a view of the front wheels, axles, and cranks for a tricycle having two large driving-wheels and a small steering-wheel; and Fig. 4, an end view of the axle or crank-shaft, illustrating the angles of the cranks.

A is the large front wheel, and B B the smaller rear wheels, of a tricycle.

The axle C of the front wheel is secured thereto in the customary manner, and passes through bearings in the ends of upright bars D″ D″, which are united in one bar, D′, over the wheel, and support a cross-bar, D, constituting the steering-handle.

E is the pole or perch connecting the upright head or fork bar D′ with the axle of the rear wheels in the usual manner. The head-bar D′ passes through and is journaled in the pole E. The pole rests upon a shoulder formed about the bar D′ just above its bifurcation, and the latter turns freely in its bearing in the former. The front end of pole E projects forward beyond the head D′. Side bars or levers, F F, are pivoted to the front end of pole E, and extend back on either side to the rear of the head D′, and are there connected by a transverse piece, forming a seat, G. These side levers, F F, are supported in a horizontal position by means of rods or pitmen L L, which, extending therefrom, are each pivoted to short cranks H H, formed upon either side of the axle C of the wheel. (See Fig. 2 of the drawings.) These two cranks are of equal length, and project from the axle in the same direction and in the same plane, so as to move in unison and cause the levers F F and seat G to rise and fall as the axle revolves.

Outside of the short cranks H H, which carry the seat-levers, longer cranks K K are formed, to project in directions opposed to each other at angles of about one hundred and twenty degrees with each other and with the short cranks H H. These outer cranks may be fitted with treadles or pedals upon their wrists in the customary manner, upon which the feet of a rider seated upon the saddle may be brought to bear; or, for use with wheels of an extreme diameter, stilt-rods N N may be pivoted thereto and extended thence upward to pass freely through guide-apertures in the ends of the handle D, said stilt-rods being fitted with suitable pedals or foot-rests, O, secured by adjustable devices to the rods, so as to permit of their adjustment to such height above the axle as will best suit the length of the rider's legs.

The attachment of the stilt-rods N N to the cranks K K is rendered adjustable by means of a series of holes, *a a*, pierced in the length of the crank-arms, (see Fig. 1,) so that the length or leverage of the crank may be varied at will. The attachment of the pitmen L L to the seat-levers F F is in like manner made adjustable by means of a series of apertures pierced in said seat-levers to receive the bolts by which the pitmen are pivoted thereto.

In constructing a tricycle with two large driving-wheels the seat-levers are pivoted to a transverse head-piece, S, supported upon standards R R, in which the two ends of the axle are journaled just inside of the wheels. The axle between the wheels is provided with four cranks, of which the two outer cranks, k k, carry the seat-rods or pitmen l l, which support and actuate or are actuated by the seat. These correspond to the short cranks H H shown in Figs. 1 and 2, and are projected both in the same direction and at the same angle with reference to the pedal-cranks.

Inside of the seat-cranks k k, and on either side of the center of the axle, the pedal-cranks h h are formed, each at an angle with the other and with the seat-cranks of about one hundred and twenty degrees, (see Fig. 4,) the central connection between their ends being completed by a connecting rod or bar, W, Figs. 3 and 4.

In the operation of this improved machine, when the rider is seated upon the saddle with his feet upon the pedals, his weight, operating upon the seat-cranks of the axle, will automatically bring one of the pedals in such position beyond the center as that the rider may immediately start the machine by bearing down upon that pedal. This movement will ease his weight from the seat, which, as its cranks turn, will thereby begin to rise. The second pedal will also move into position, so that, by the time the first pedal has reached a point at which the downward thrust of the rider's foot will no longer do effective service thereon because of the change of leverage, the rider may throw his weight with effect upon the second pedal. By the time this has passed the point of effective leverage thereon the seat will have risen to its extreme height and its cranks will have passed the center, so that by dropping fully into the seat again the rider will transfer his whole weight upon those cranks, while the first pedal-crank moves forward into its first position. By this means the entire weight of the rider is constantly thrown upon a crank-lever placed in the most effective position for service, being readily and easily transferred from one crank to another in succession, so soon as the effective position is lost by the one and attained by the other.

I prefer to make the seat-cranks one-half shorter than the pedal-cranks, so that the movement of the seat may be an easy one.

It is evident that by my improved arrangement of the pedal-cranks at an angle of one hundred and twenty degrees with each other the throw or stretch of the rider's feet and legs in running the machine is much less than where the cranks are directly opposed.

The levers F F, carrying the seat, may be pivoted to a fixed support in the rear of the rider, instead of in front of him, as is illustrated in the drawings, without materially changing the operation of the machine, and I contemplate such a change in the structure of the machine, as also the combination of springs with the seat or with the seat-levers F F, to modify and ease the movements thereof. I contemplate likewise substituting a shaft revolving freely in suitable fixed bearings for the driving-axle of the machine illustrated in the drawings, so that the devices employed to produce a rotation of the axle may be made to produce a rotation of the shaft, and be utilized as a motive power for light work. In making such an application as this of my invention the shaft with its double cranks may be hung overhead and the seat or saddle placed beneath it, the connecting-links between the saddle and cranks being carried up to the shaft instead of down to an axle, as shown in the drawings, and the pedals or treadles for the feet likewise connected with their proper cranks by pitmen. The shaft, provided with a suitable fly-wheel to equalize its movement, is then made to revolve under the influence of the whole weight of the operator, which is brought to bear thereon by his alternately rising upon his feet and sitting down upon the saddle, in the manner as hereinbefore described.

The weight and effort of two or more operators may be readily brought to bear upon a single shaft by simply duplicating the saddle and crank and pedals, as set forth.

The seats and cranks may be so arranged on the shaft or axle that while the seat-weight of one operator bears on the short cranks the feet-weight of another will at the same time bear on long cranks, and thus alternating equalize the power throughout each revolution.

What I claim as new, and desire to secure by Letters Patent, is—

1. The combination, with each other and with the axle and wheels of a bicycle or tricycle, of pedal-cranks K K, placed at an angle of about one hundred and twenty degrees with each other, and shorter seat-cranks projecting at an angle of about one hundred and twenty degrees with said pedal-cranks, substantially in the manner and for the purpose herein set forth.

2. The combination of pivoted seat-levers F F, vibrating vertically, and of cranks H H, actuating and actuated by said seat-levers, with pedal-cranks K K, formed upon the crank-shaft or axle at an angle of about one hundred and twenty degrees with each other and with said seat-cranks H, substantially in the manner and for the purpose herein set forth.

In testimony whereof I have signed my name to this specification in the presence of two subscribing witnesses.

NELSON MERRILL.

Witnesses:
DAVID A. BURR,
J. F. ACKER, Jr.